Dec. 22, 1931.  J. C. DESTRÉE  1,837,953
SCREEN, PARTICULARLY WIND SCREEN FOR VEHICLES
Filed Oct. 4, 1929
Fig: 1
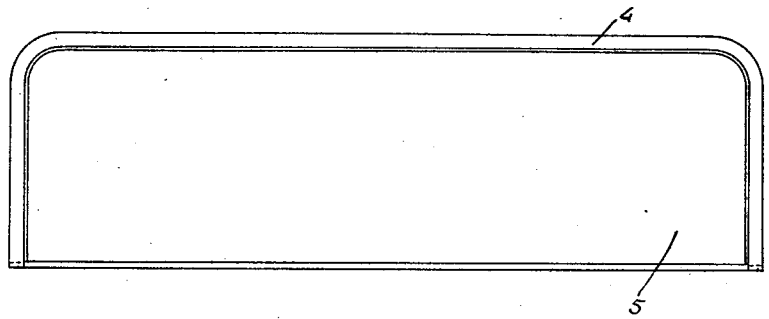
Fig: 2
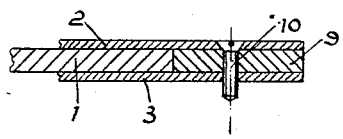
INVENTOR
Joseph C. Destrée
BY
ATTORNEYS Patented Dec. 22, 1931

1,837,953

UNITED STATES PATENT OFFICE

JOSEPH CONSTANT DESTRÉE, OF THE HAGUE, NETHERLANDS

SCREEN, PARTICULARLY WIND SCREEN FOR VEHICLES

Application filed October 4, 1929, Serial No. 397,307, and in the Netherlands August 16, 1929.

The invention relates to a safety screen which when subjected to a blow or a strain does not fall into splinters, so that it is not possible for persons who may be behind or in the vicinity of the glass screen to be struck or wounded by splinters. The screen, according to the invention, is essentially intended for use in motor cars, motor omnibuses, and other vehicles which are liable to meet with collisions and other traffic accidents. The screen may also be used for the protection of the public anywhere where the above-mentioned danger exists, that is, for example, in glass-covered courtyards in hotels, restaurants, theatres, and the like.

According to this invention a sheet of glass is covered on each side with a plate of transparent material as for example celluloid. These plates may rest loosely against the glass sheet, and be enclosed with the sheet in a common rim or frame. The construction of the frame is preferably such that the screen with the celluloid plates may be easily removed, if this should be necessary for the purpose of removing from between the plates and the glass sheet any dust or deposit.

Glass sheets are already known provided with a protection of woven wire, or the like. Such glass screens are, however, not sufficiently transparent, (the protection of woven metal wire disturbs the view), and are not therefore suitable as window glasses in vehicles such as motor cars, aircraft, and the like. Furthermore, they are so expensive that even where their insufficient transparency is no disadvantage, they cannot obtain the general use which is desirable in view of the safety of the driver and of the passengers.

An advantage of the present invention consists in that a plate may be easily cut into the desired shape. The same holds good also with regard to the plates of celluloid or other material arranged on the two sides, so that by very simple means and in a short time a new safety screen can be produced, and a broken plate be at once replaced. A long wait with a possibly broken screen is therefore avoided.

The safety screen, according to the invention, can in consequence of its easy manufacture be quickly and simply fitted to any existing motor or other vehicle.

The invention is illustrated in the accompanying drawings as applied to a wind screen (front protecting screen) of a motor vehicle.

Figure 1 is a front view of the wind screen.

Figure 2 is a cross section through the edge of a glass sheet constructed in accordance with my invention.

In the drawings, 4 represents a frame of a usual type of wind shield, suitably grooved to receive my assembled glass shield 5.

Referring to Figure 2, the reference character 1 represents the sheet of glass which is covered on both sides with a plate of celluloid 2, 3, or other transparent resilient material. The celluloid plates project beyond the edges of the glass plate, and the space between the celluloid plates thus formed is filled by a strip of celluloid or other material 9, (for this purpose non-transparent material may be used). The celluloid plates 2, 3 and the strip 9 are suitably apertured to receive a screw 10 to fix the plates in a frame. In this manner, the glass plate is as free as possible from strain which otherwise would be exerted thereon by the fastening screw.

The glass sheet is in this case enclosed between the celluloid plates and is therefore dust and moisture tight.

The invention is not limited to the use described but may be used in all cases where splintering dangers exist.

What I claim is:—

1. A safety screen comprising a glass plate, celluloid plates on opposite sides of and covering said glass plate, and projecting beyond the edges thereof, and means for securing said projecting portions of said celluloid plates to confine said glass therebetween.

2. A safety screen comprising a glass plate, celluloid plates on opposite sides of and covering said glass plate to confine the glass plate therebetween and having projecting end portions, a filler block between said projecting end portions of a thickness approximately that of the plate glass and said block and said projecting end portions being apertured for the reception of fastening means.

JOSEPH CONSTANT DESTRÉE.